(12) United States Patent
Wang et al.

(10) Patent No.: US 8,401,041 B2
(45) Date of Patent: Mar. 19, 2013

(54) ROBUST SYNCHRONIZATION FOR TIME DIVISION DUPLEX SIGNAL

(75) Inventors: Chunye Wang, Beijing (CN); Yuan Joshua Zhu, Beijing (CN)

(73) Assignee: Nokia Corporation, Espoo (FI)

(*) Notice: Subject to any disclaimer, the term of this patent is extended or adjusted under 35 U.S.C. 154(b) by 584 days.

(21) Appl. No.: 12/028,278

(22) Filed: Feb. 8, 2008

(65) Prior Publication Data

US 2008/0219191 A1    Sep. 11, 2008

Related U.S. Application Data

(60) Provisional application No. 60/888,894, filed on Feb. 8, 2007.

(51) Int. Cl.
*H04J 3/06* (2006.01)
(52) U.S. Cl. ...................................... 370/503
(58) Field of Classification Search .......... 370/324, 370/350, 503, 509, 510, 512–514
See application file for complete search history.

(56) References Cited

U.S. PATENT DOCUMENTS

| | | | | | |
|---|---|---|---|---|---|
| 4,295,223 | A | * | 10/1981 | Shutterly | 455/72 |
| 5,473,612 | A | * | 12/1995 | Dehner et al. | 370/514 |
| 6,650,904 | B1 | * | 11/2003 | Lin et al. | 455/522 |
| 7,321,610 | B2 | * | 1/2008 | Lu | 375/148 |
| 7,639,733 | B1 | * | 12/2009 | Lee et al. | 375/149 |
| 2003/0182105 | A1 | * | 9/2003 | Sall et al. | 704/206 |
| 2008/0187136 | A1 | * | 8/2008 | Zhang et al. | 380/270 |
| 2010/0061427 | A1 | * | 3/2010 | Lopez-Risueno et al. | 375/150 |

* cited by examiner

*Primary Examiner* — Mark Rinehart
*Assistant Examiner* — Peter Cheng
(74) *Attorney, Agent, or Firm* — Ditthavong Mori & Steiner, P.C.

(57) ABSTRACT

The present invention relates to a method, apparatus, system and computer program product, wherein a time division multiplex signal is received with a periodic first time period allocated to a downlink transmissions and a periodic second time period allocated to uplink transmissions. A decision time metric is obtained by correlating the received signal with a replica signal in order to detect a synchronization pattern provided in the first time period. Then, a slide window based normalization with a time window long enough to accommodate said second time period is applied to the decision time metric.

15 Claims, 6 Drawing Sheets

ROBUST SYNCHRONIZATION FOR TIME DIVISION DUPLEX SIGNAL

FIELD OF THE INVENTION

The present invention relates to a method, apparatus, and computer program product for synchronizing a receiver to a time division duplex signal.

BACKGROUND OF THE INVENTION

There are various situations where a receiver or receiving end of a communication system must be synchronized with a received signal or channel in order to provide access to the communication system. One example is the cell search procedure in cellular systems. According to proposal R1-061651 for the $3^{rd}$ Generation Partnership Project (3GPP) specification TR25.814, v.1.5.0, cell search is the first step for a terminal device (or user equipment (UE) in 3G terminology) to acquire the enhanced universal territory radio access (EUTRA) system with very limited prior information. This procedure includes detecting a synchronization channel (SCH) position, detecting a cell identity (ID), and reading a broadcast channel (BCH). Information a UE could use in this procedure comprise centre frequency (an operator related value which may be pre-stored in the UE), an SCH bandwidth (e.g. central 1.25 MHz regardless of the operating system bandwidth), part of the SCH sequence information, like repetition times, sequence formats and so on.

Besides other problems faced during synchronization, time division duplex (TDD) systems in which different periodic time periods or time slots are allocated to uplink (UL) and downlink (DL) channels will have additional problems due to their TDD nature. One of these problems is that there could be strong UE-to-UE interference between closely located UEs. As an example, such an UE-to-UE interferences may occur when one UE is doing cell search while the other UE is transmitting.

FIG. 2 shows a situation where a second UE (UE2) starts to search a cell when a close-by first UE (UE1) is transmitting data. Such kind of situations are quite usual in a real networks. The results of UE-to-UE interference could be that the interfered second UE (UE2) cannot detect the network just because there is strong interference in the UL period or slot of the whole frame of a broadcast signal received from a base station (BS) or other access device.

SUMMARY

It is therefore an object of the present invention to provide a synchronization method and apparatus, by means of which synchronization can be made more robust against interference.

This object is achieved by a method comprising:
receiving a time division multiplex signal with a periodic first time period allocated to a downlink transmissions and a periodic second time period allocated to uplink transmissions;
obtaining a decision time metric by correlating said received signal with a replica signal in order to detect a synchronization pattern provided in said first time period; and
applying to said decision time metric a slide window based normalization with a time window long enough to accommodate said second time period.

Additionally, the above object is achieved by an apparatus comprising:

a receiver for receiving a time division multiplex signal with a periodic first time period allocated to a downlink transmissions and a periodic second time period allocated to uplink transmissions;
a first processing stage for obtaining a decision time metric by correlating said received signal with a replica signal in order to detect a synchronization pattern provided in said first time period; and
a second processing stage for applying to said decision time metric a slide window based normalization with a time window long enough to accommodate said second time period.

Moreover, the above object is achieved by a computer program product comprising code means for producing the steps of the above-defined method when run on a computer device.

Accordingly, a slide window based normalization with the big time window can be used to make synchronization more robust to interference. A higher interference can even be used to achieve better cell detection performance for time division duplex systems, so that auto correlation based synchronization or detection methods, such as the one proposed in proposal R1-060930, "Cell Search procedure of EUTRA TDD system for the initial synchronization", CATT, RITT, can be made more robust to interference.

In an embodiment, the slide window based normalization may only be applied, when a ratio between a difference between a maximum value and a minimum value of a window function and a mean value of said window function is larger than a predetermined value, the window function corresponding to an autocorrelation of the received time division duplex signal within the time window.

The slide window based normalization may be for example applied by multiplying the decision time metric by an absolute value of a difference between a value of the window function and said mean value of the window function.

The correlation for the decision time metric may be performed over the length of the replica signal, and the decision time metric may be obtained for a total frame length of the received time division duplex signal.

Furthermore, the synchronization pattern may indicate a position of a downlink synchronization channel used for accessing a wireless network.

Further advantageous modifications are defined in the dependent claims.

BRIEF DESCRIPTION OF THE DRAWINGS

In the following, the present invention will be described in greater detail based on embodiments with reference to the accompanying drawings, in which.

DESCRIPTION OF THE PREFERRED EMBODIMENT

An embodiment will now be described based on a cell search procedure of a UMTS Terrestrial Radio Access Network (UTRAN) environment, such as for example an enhanced universal territory radio access (EUTRA) environment. However, it is pointed out that the proposed synchronization scheme can be used for various other synchronization purposes, where a synchronization pattern is to be detected, and in various other network environments, such as cellular or non-cellular networks.

Figure 1:
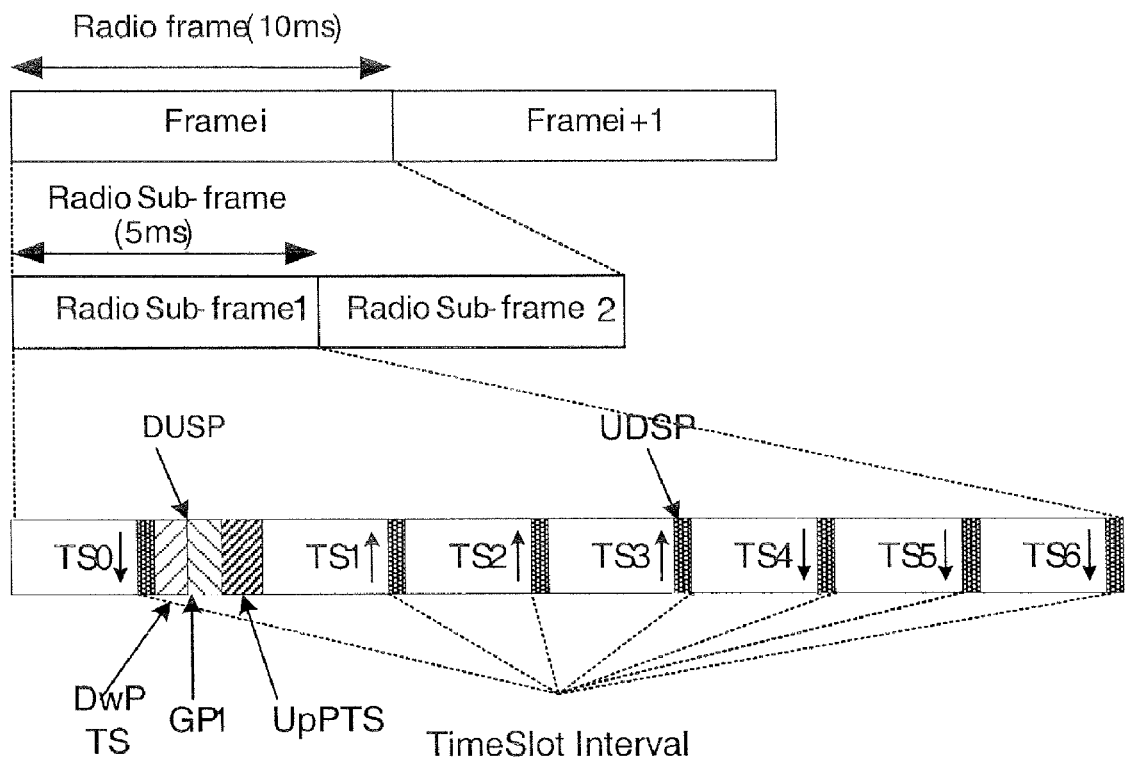
FIG. 1 shows an exemplary frame structure of one pair of switching points between uplink and downlink traffic timeslots.
Figure 2:
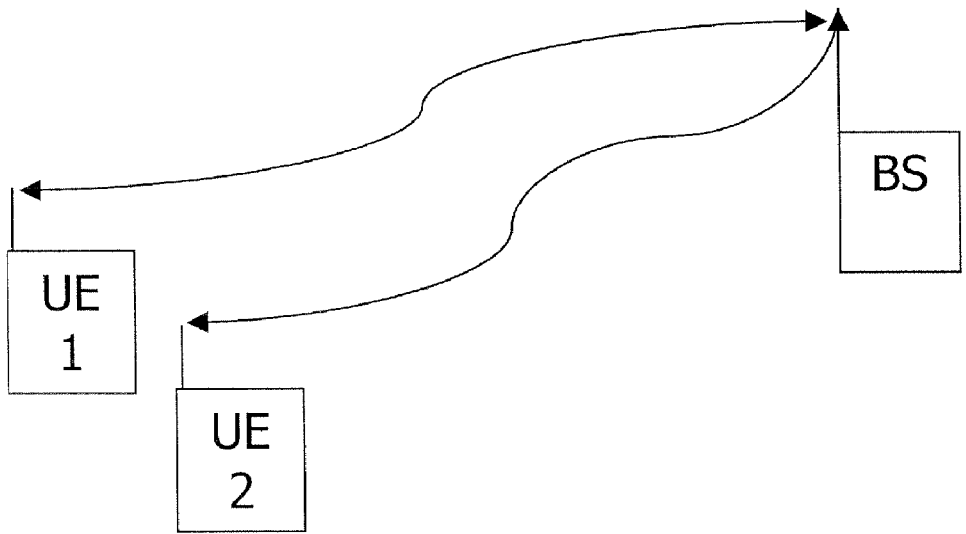
FIG. 2 shows a schematic diagram indicating a cell-searching terminal and an interfering transmitting terminal.

FIG. 1 shows an exemplary frame structure of one pair of switching points between UL and DL traffic timeslots. In FIG. 1, one radio frame of e.g. 10 ms can be divided into two sub-frames of e.g. 5 ms. Each sub-frame contains seven traffic timeslots and three special timeslots. The length of the three special timeslot DwPTS, GP1 and UpPTS between TS0 and TS1 can be set to 275 us.

The special timeslot DwPTS is a downlink initial synchronization timeslot which can be used for cell DL initial synchronization access. When UEs do cell search, a DL synchronization pilot or pattern in DwPTS can be searched to obtain an initial synchronization information. Then, DL time synchronization and frequency synchronization can be established through the DwPTS timeslot.

As one special time duration, the timeslot UpPTS is an UL access timeslot which can be used for transmission of an UL synchronization pilot signal. The UL synchronization pilot signal is transmitted from the UE to the base station (or "Node B" in 3G terminology) in this timeslot to achieve uplink synchronization.

The timeslot GP1 between the timeslots DwPTS and UpPTS provides a protection gap for switching from DL to UL. The length of GP1 determines the coverage radius of the TDD cell.

In the embodiment, the system can support scaleable transmission bandwidth from 1.25 MHz to 20 MHz. Thus, various types of UE with different bandwidth capabilities must be considered. Furthermore, Node Bs with various frequency band capabilities must be considered. For instance, a UE with a maximum bandwidth capability of 20 MHz must be able to establish a radio link to a Node B using a scalable bandwidth from 1.25 to 20 MHz. Similarly, a UE with a 5-MHz bandwidth capability must be able to establish a radio link to a base transceiver station (BTS) using a scalable bandwidth. The SCH design for the timeslot DwPTS should ensure that UEs with different bandwidth capacities can access the system and achieve synchronization. So, the SCH can be defined with a bandwidth of 1.25 MHz.

More specifically, in the embodiment, the SCH can be placed in the DwPTS timeslot every 5 ms with a bandwidth of 1.25 MHz. Meanwhile for all UEs to receive basic system broadcast information, the BCH is set in timeslot TS0, and it is also allocated within the central 1.25 MHz spectrum. In this way the UE can obtain basic system information, e.g., system bandwidth. In a specific example, the SCH may be composed of an OFDM symbol with sub-carrier spacing of e.g. 15 KHz, so that the duration of the OFDM symbol is 66.67 us. The bandwidth of the SCH is 1.25 MHz. The OFDM symbol parameters may be the same as listed in specification TR25.814 v.1.0.2 "Physical Layer Aspects for Evolved UTRA", Helsinki, Finland, Jan. 25-27, 2006. The cyclic prefix (CP) duration of the OFDM symbol in the SCH may be set to 8 samples (4.165 us). It is noted that there may be one SCH used for DL initial synchronization in every DwPTS timeslot. Because the SCH is constructed in one standalone timeslot, the CP duration can be fixed without considering the effects of long and short CP in traffic timeslots on the construction of SCH.

According to an embodiment, a UE can utilize the following procedure to realize cell search. This procedure enables fast initial synchronization with the TDD system and reception of system broadcast information. A first step of the cell search procedure for initial synchronization is coarse time synchronization using the OFDM symbol of the primary SCH. For all cells of the TDD system, one of several (e.g., three) types of OFDM symbols may be sent in the SCH. When the UE starts the cell search, the coarse time synchronization can be obtained using a time domain cross correlation method. Because the UE knows the OFDM symbol sent in the primary SCH, by performing cross correlation between a known OFDM sequence and the received sequence, high synchronization precision can be achieved.

A cell group identity (ID) may be related to the secondary SCH in which one of a number of cell group IDs will be conveyed. The UE will find the cell group ID by detecting its pre-known pattern. By detecting cell group ID, the hypothesis which needs to be tested in the following cell ID detecting step will be decreased.

The cell ID may be related to the first reference symbols within the central 1.25 MHz of timeslot TS0. The UE can find the cell ID from a received pilot sequence. Different cells use difference pilot sequences, which may be implemented with a pseudo noise (PN) code. Cell ID can then be found by judging the PN code of received pilot sequence from the detected cell group, as described for example in proposal R1-051549, "Cell Search procedure for initial synchronization and neighbour cell identification," Seoul, Korea, Nov. 7-11, 2005.

After time synchronization and frequency error correction, the UE is able to read the system broadcast information. Basic system information can be broadcasted through the central 1.25 MHz band, so that the UE can obtain basic system configuration information, for example system bandwidth, etc, and finish the cell search process.

The decision time metrics for synchronization to the SCH could be based on a cross correlation as expressed by the below equation:

$$M(d) = \sum_{k=0}^{L-1} s*(d+k \bmod N)r(k) \quad d = 0, 1, \ldots N-1 \quad (1)$$

where N is total frame length of the TDD receiving signal, L is the length of a local replica of the known synchronization pattern, e.g., OFDM symbol as mentioned above, s(d) is a sample of the TDD receiving signal, and r(d) is the local replica. Here, "mod" means modulo, because the receiving signal is a periodic signal.

Figure 3:
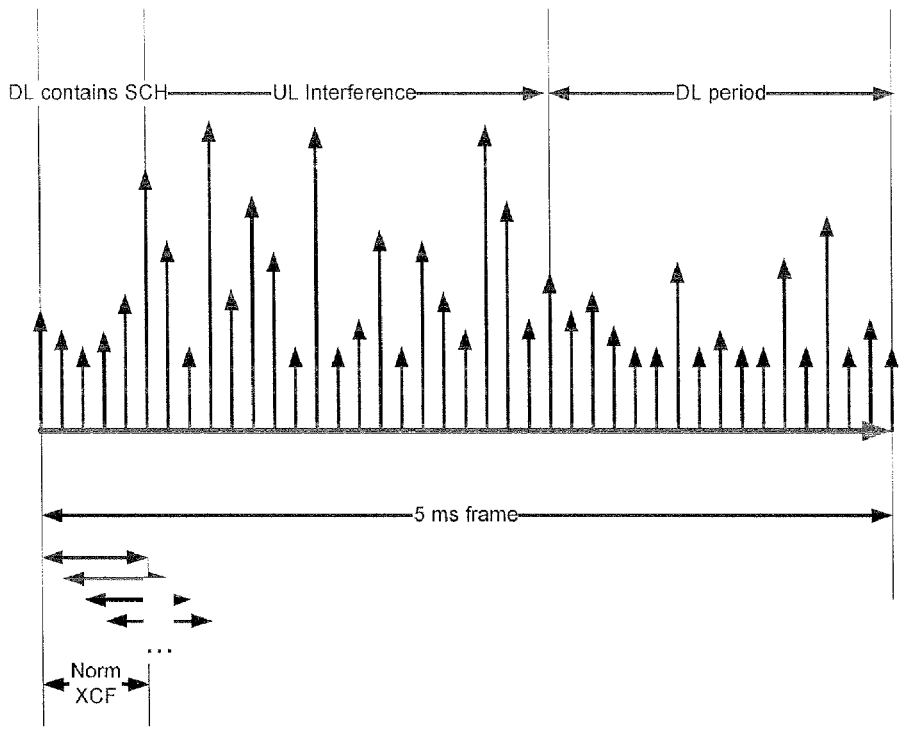
FIG. 3 shows a schematic signal diagram with a cross correlation window.

FIG. 3 shows a schematic signal diagram with a cross correlation window to be used for an additional correlation window based normalization of the windowed receiving signal before cross correlation with a local replica of the known synchronization pattern, e.g., OFDM symbol as mentioned above. In FIG. 3, sampled amplitude values of the receiving signal are shown as arrows. It can be seen that the UL period has strong interference and this may overwhelm the real SCH correlation peaks of the DL period.

The decision time metric after applying an additional correlation window based normalization is expressed by the below equation:

$$M(d) = \frac{\sum_{k=0}^{L-1} s*(d+k\bmod N)r(k)}{\sqrt{\sum_{k=0}^{L-1} s*(d+k\bmod N)s(d+k\bmod N)}} \quad (2)$$

$$d = 0, 1, \ldots N-1$$

The rationale behind the correlation window based normalization is to utilize the reasons of correlation peaks in the DL period and the correlation peaks in the UL period. The first one is caused by strong cross correlation attributes and the second one is caused by strong interference energy. So by normalization, the UL signal can't take advantage of its strong energy to overwhelm the real SCH correlation peaks.

The decision could then be made as follows:

$$d_{opt} = \underset{d}{\mathrm{argmax}}(M(d)) \quad d = 0, 1, \ldots N-1 \quad (3)$$

where $d_{opt}$ indicates the timing of the synchronization patter.

As already mentioned above, the SCH position is at the DwPTS special time slot. The UL interference which may occur during an initial cell synchronization performance can be expressed with a DL interference to signal ratio (ISR). By adding the above cross window based normalization, the cell detection performance is robust to ISR now. However for high ISR, it actually implicitly tells the UL period and could additionally be used to increase the cell detection performance in the following manner.

Figure 4:
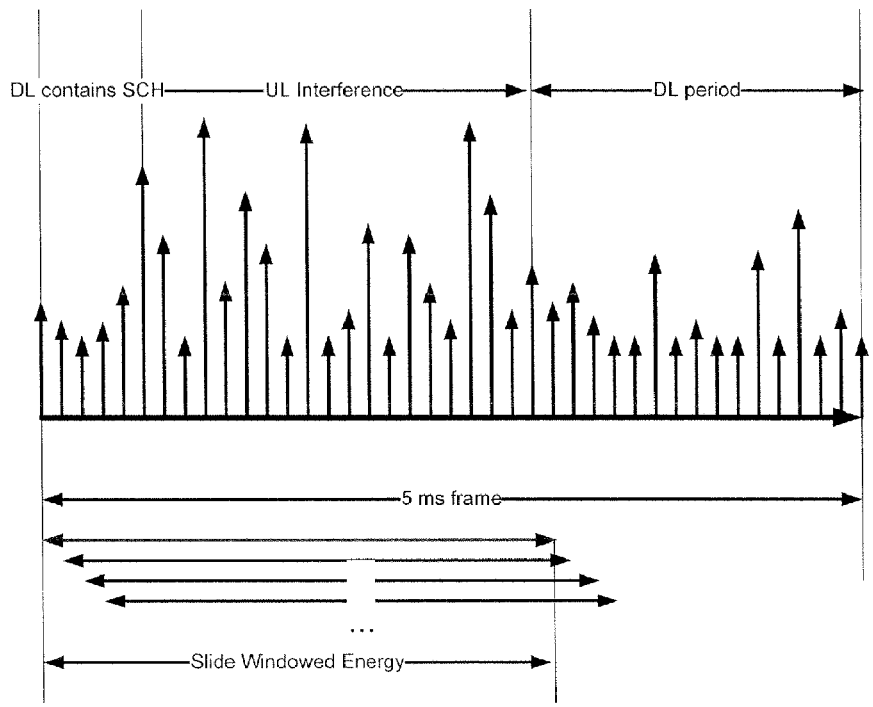
FIG. 4 shows a schematic signal diagram with a big normalization window.

FIG. 4 shows a schematic signal diagram with an enlarged sliding normalization window according to an embodiment.

Here, an enlarged or big slide window based normalization method is proposed, which can be expressed by the below equations:

$$W(d) = \sum_{k=0}^{M-1} s*(d+k\bmod N)s(d+k\bmod N) \quad d = 0, 1, \ldots N-1 \quad (4)$$

where W(d) is a window function and M is the window length. M is designed to be long enough to accommodate the whole uplink period. As a mere example, the window could be configured to cover 4800 samples to account for 2.5 ms.

In a specific embodiment, the above window function can be conditionally applied to the above decision time metrics, when the below condition is met:

$$(\max(W)-\min(W))/\mathrm{mean}(W) > \alpha \quad (5)$$

where max is an operation to find the maximum item over the whole window function, min is an operation to find minimum item over the whole window function and mean is an operation to find the average value of the whole window function. α is a parameter which may be set to "1", for example. Thereby, the slide window based normalization is only applied if a predetermined level of variation of the window function W(d) occurs.

The window function can be applied to the time decision metric by using the following equation:

$$M'(d)=M(d)*|(W(d)-\mathrm{mean}(W))|d=0,1,\ldots N-1 \quad (6)$$

The new decision time metric M'(d) will then supersede the old one for decision making, e.g., as obtained from equation (2).

Figure 5:
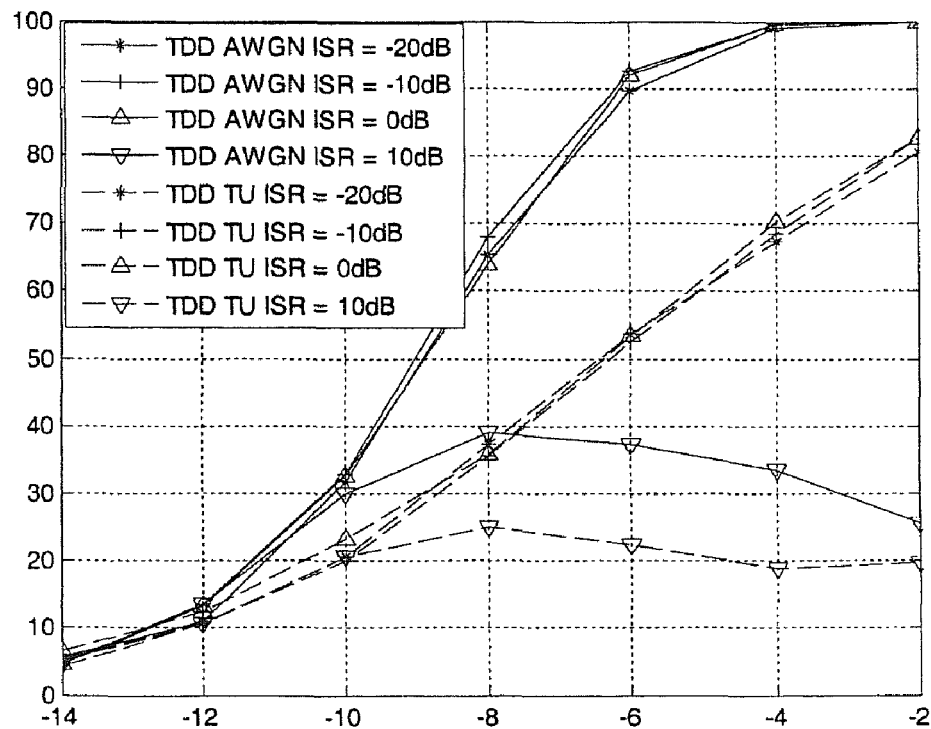
FIG. 5 shows a diagram indicating cell detection performance with different ISR and channels.

FIG. 5 shows a diagram indicating cell detection performance with different ISR ratios and a typical urban (TU) channel. The cell detection probability is shown under different ISR ratios for additive white Gaussian noise (AWGN) distribution and a slowly fading channel, such as a TU3 (Typical Urban, speed 3 km/h) channel. It can be seen that when ISR is 10 dB, the cell detection probability decreases obviously if a conventional synchronization procedure without correlation window based normalization is applied. The cell detection definition refers to the situation that a cell is considered to have been detected if the detected timing is within the time period [0, CP] of the real arrival of the first tap of the receiving signal.

Figure 6:
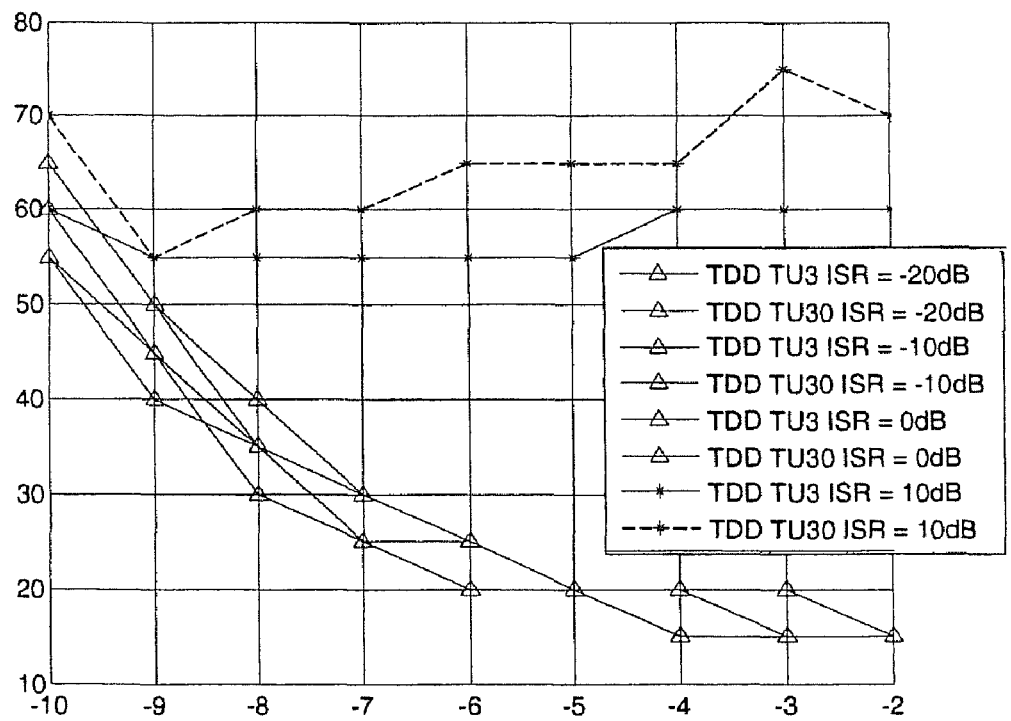
FIG. 6 shows a diagram indicating ninety percentile cell detection time at different ISR and channels.

FIG. 6 shows a diagram indicating ninety percentile cell detection time at different ISR and channels for a conventional synchronization procedure. More specifically, a ninety percentile cell detection performance curve is shown for TU3 and TU30 channels of different speeds 3 km/h and 30 km/h. It can be seen that when ISR is 10 dB, the UE needs much longer time to detect a cell under both TU3 and TU30 channel. For higher ISR ratios, the UE can't even detect the cell.

Figure 7:
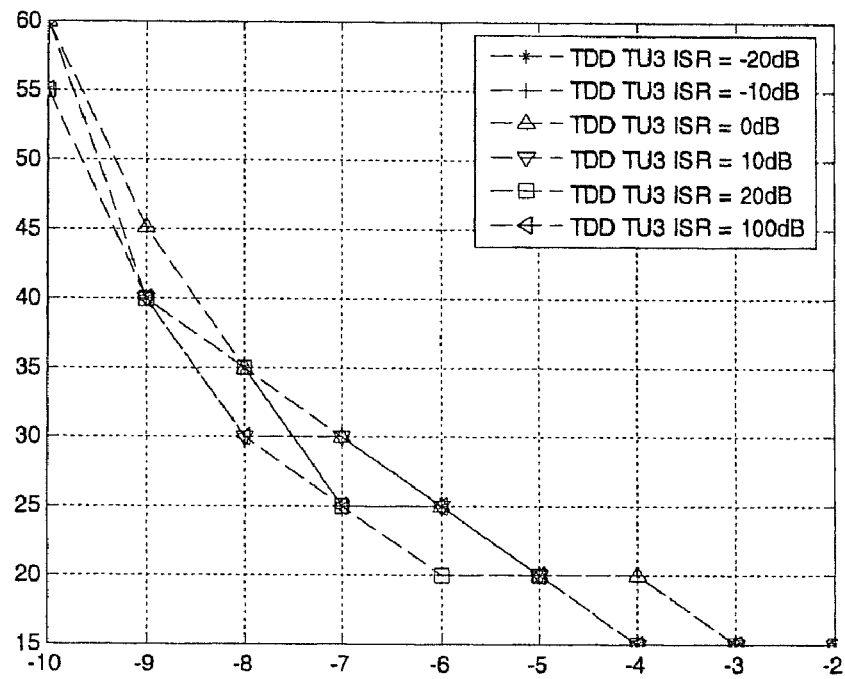
FIG. 7 shows a diagram indicating ninety percentile cell detection time at different ISR and channels after applying cross correlation window based normalization.

FIG. 7 shows a diagram indicating ninety percentile cell detection time at different ISR and channels after applying cross correlation window based normalization according to the above equation (2). Even at ISR of 100 dB, no loss of performance is perceivable, so that the performance is more robust to ISR.

Figure 8:
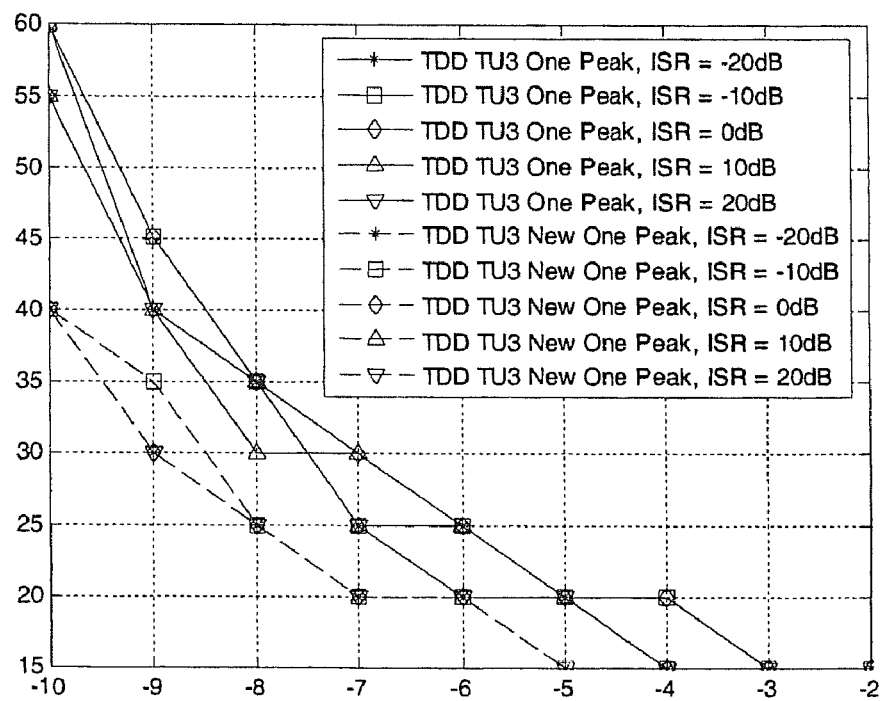
FIG. 8 shows a diagram indicating ninety percentile cell detection time at different ISR and channels after applying a big normalization window.

FIG. 8 shows a diagram indicating ninety percentile cell detection time at different ISR and channels after applying the proposed big normalization window. It can be seen that for ISR higher than 20 dB, there is almost 1-2 dB performance gain.

Figure 9:
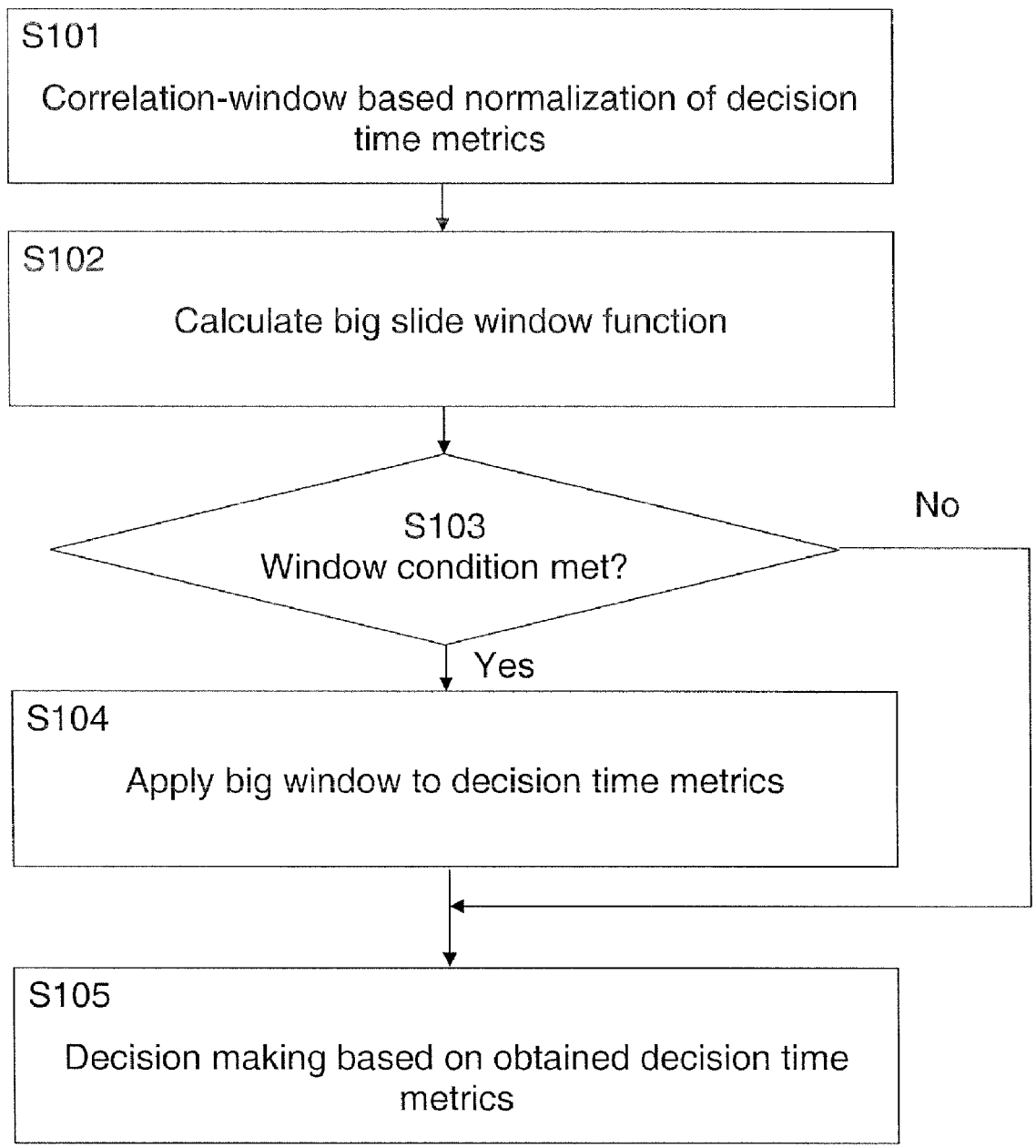
FIG. 9 shows a flow diagram of a synchronization procedure according to an embodiment.

FIG. 9 shows a flow diagram of a general synchronization procedure according to an embodiment.

In a first step S101 a correlation-window based normalization of a decision time metric is performed, to thereby increase robustness to interference. Then, in step S102, a slide window function is calculated, e.g., based on the above equation (4), as an auto correlation with a time window covering or accommodating the uplink period of the receiver TDD signal. Now, in step S103 it is checked whether a set condition for applying the window based normalization is met. The condition could be based on the above equation (5) or any other suitable condition reflecting the effect of UL interference. If it is determined in step S103 that the condition is not met, the decision making about the synchronization timing is performed in step S105 using the correlation-window based normalization of step S101, e.g., according to equation (2).

On the other hand, if it is determined in step S103 that the condition is met, the window-based normalization with the big time window is applied in step S104 to the decision time metrics, e.g., as defined in equation (6), to thereby take additional advantage of the interference introduced by the UL period. Then, the procedure advances to step S105 where the decision making about the synchronization timing is performed using the modified window based normalization with big sliding window of step S104.

Figure 10:
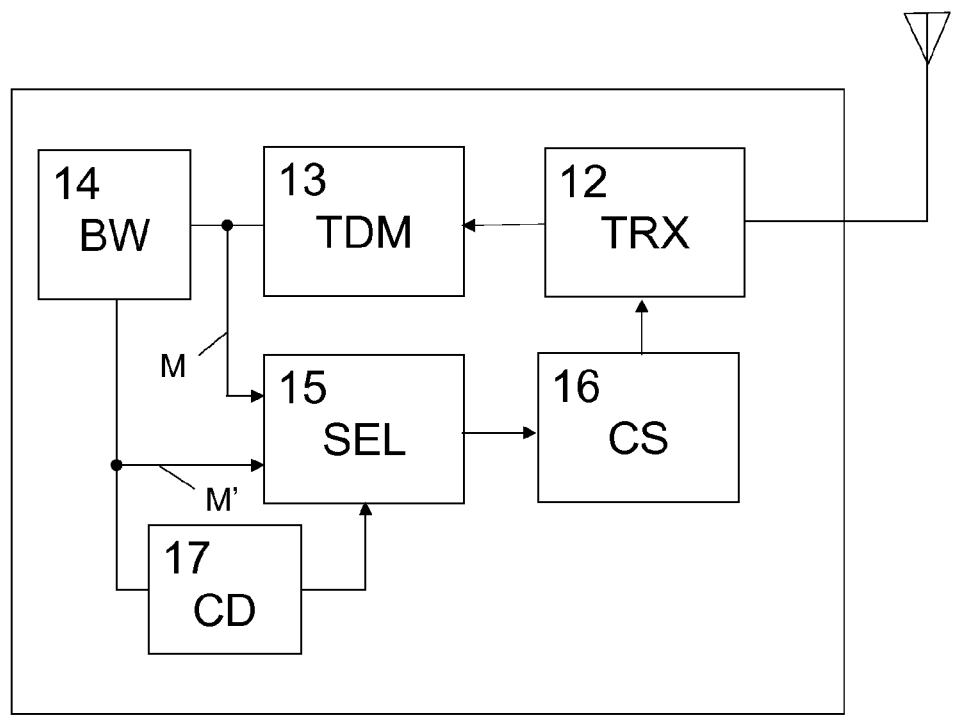
FIG. 10 shows a schematic block diagram of a terminal device according to an embodiment.

FIG. 10 shows a schematic block diagram of a terminal device according to an embodiment, in which the proposed synchronization procedure is implemented by corresponding processing stages. This terminal device may be UE, a mobile phone, smart phone or any other type of transmit and receive unit for accessing a wireless network.

A TDD signal is received on a radio frequency level via an antenna and a transceiver circuit 12. After down conversion, demodulation etc., the signal is supplied to a first processing stage 13, where a correlation-window based normalization of a decision time metric is performed based on a local replica and the received TDD signal, to obtain a signal or sequence M(d). Then, in a second stage which consists of blocks 14, 15 and 17, a slide window based normalization is selectively applied to obtain M'(d). The second processing stage includes a slide window function calculation unit 14 which is based on the above equation (4). The output of the calculation unit 14 is supplied to a decision unit 17 configured to check whether a set condition for applying the window based normalization is met. The condition could be based on the above equation (5) or any other suitable condition reflecting the effect of UL interference. If the decision unit 17 determines that the condition is not met, it controls a selection unit 15 to select M(d) and forward it to a cell searching unit 16 configured to perform a cell searching procedure and decide on the synchronization timing. The decision making about the synchronization timing is thus performed using the correlation-window based normalization, e.g., according to equation (2), without big slide window based normalization. Otherwise, if the decision unit 17 determines that the condition is met, it controls the selection unit to select the window-based normalization result M'(d) with the big time window, and forward it to the cell searching unit 16, where optimum synchronization timing is decided.

Figure 11:
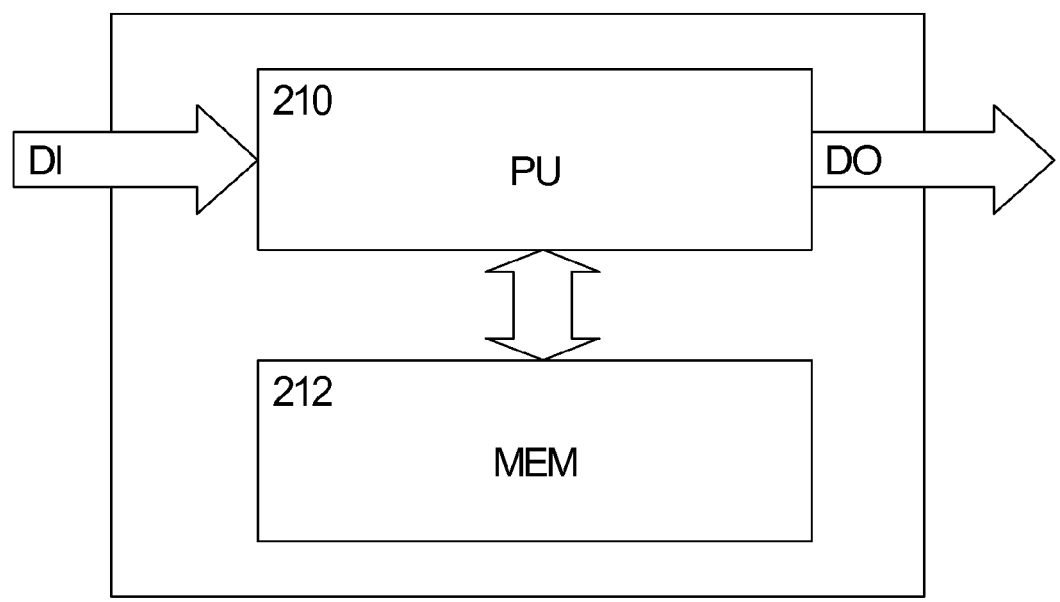
FIG. 11 shows a schematic block diagram of a software-based implementation according to an embodiment.

FIG. 11 shows a schematic block diagram of a software-based implementation of the proposed functionalities for achieving channel-sensitive complexity adjustment. These functionalities can be implemented with a processing unit 210, which may be any processor or computer device with a control unit which performs control based on software routines of a control program stored in a memory 212. Program code instructions are fetched from the memory 212 and are loaded to the control unit of the processing unit 210 in order to perform the processing steps of the above functionalities described in connection with the respective branch selection and signal processing blocks 13 to 17 of FIG. 10 and the flow diagram of FIG. 9. These processing steps may be performed on the basis of input data DI and may generate output data DO, wherein the input data DI may correspond to the samples of the TDD signal, and the output data DO may correspond to the detected synchronization timing of the received TDD signal.

In summary, a method, apparatus, system and computer program product have been described, wherein a time division multiplex signal is received with a periodic first time period allocated to a downlink transmissions and a periodic second time period allocated to uplink transmissions. A decision time metric is obtained by correlating the received signal with a replica signal in order to detect a synchronization pattern provided in the first time period. Then, a slide window based normalization with a time window long enough to accommodate said second time period is applied to the decision time metric.

Thus, synchronization can be made more robust to interference for TDD systems. A high ISR can even be exploited to achieve even better cell detection performance. Compared to conventional procedures, such as the above mentioned auto correlation based detection method according to R1-060930, up to 9 dB performance gain could be achieved. Two normalization operations can be provided before and after cross correlation for every slide window. The resulting additional processing load is however not very high and can be optimized through some computer algorithm.

Applying the proposal synchronization procedure directly to TDD systems with cross correlation window based normalization, such as described for example in "Robust frequency and timing synchronization for OFDM", Timothy M. Schmidl and Donald C. Cox, Fellow, IEEE, will make cell detection performance more robust to interference. As already mentioned, it will even make cell detection performance better at high ISR due to exploitation of the UL period.

The present invention is not restricted to the above predetermined embodiment with its specific network elements. For example, the present invention is applicable to any communication system which provides a downlink synchronization pattern in a signal with a periodic first time period allocated to a downlink transmissions and a periodic second time period allocated to uplink transmissions. The preferred embodiment may thus vary well within the scope of the attached claims.

The invention claimed is:

1. A method comprising:
receiving a time division duplex signal with a periodic first time period allocated to at least one downlink timeslot transmission and a periodic second time period allocated to at least one uplink timeslot transmission;
determining to obtain a decision time metric by correlating said received signal with a replica signal in order to detect a synchronization pattern provided in said first time period allocated to the at least one downlink timeslot transmission; and
determining to apply to said decision time metric a slide window based normalization with a time window long enough to accommodate said second time period allocated to the at least one uplink timeslot transmission.

2. The method according to claim 1, wherein said slide window based normalization is only applied, when a ratio between a difference between a maximum value and a minimum value of a window function and a mean value of said window function is larger than a predetermined value, said window function corresponding to an autocorrelation of said received time division duplex signal within said time window.

3. The method according to claim 2, wherein said slide window based normalization is applied by multiplying said decision time metric by an absolute value of a difference between a value of said window function and said mean value of said window function.

4. The method according to any one of the preceding claims, wherein said correlation for said decision time metric is performed over the length of said replica signal, and said decision time metric is obtained for a total frame length of said received time division duplex signal.

5. The method according to claim 4, wherein said synchronization pattern indicates a position of a downlink synchronization channel used for accessing a wireless network.

6. An apparatus comprising:
at least one processor; and
at least one memory including computer program code,
the at least one memory and the computer program code configured to, with the at least one processor, cause the apparatus to:
receive a time division duplex signal with a periodic first time period allocated to at least one downlink timeslot transmission and a periodic second time period allocated to at least one uplink timeslot transmission;

determine to obtain a decision time metric by correlating said received signal with a replica signal in order to detect a synchronization pattern provided in said first time period allocated to the at least one downlink timeslot transmission; and determine to apply to said decision time metric a slide window based normalization with a time window long enough to accommodate said second time period allocated to the at least one uplink timeslot transmission.

7. The apparatus according to claim 6, wherein the apparatus is configured to apply said slide window based normalization only if a ratio between a difference between a maximum value and a minimum value of a window function and a mean value of said window function is larger than a predetermined value, said window function corresponding to an autocorrelation of said received time division duplex signal within said time window.

8. The apparatus according to claim 7, wherein the apparatus is configured to apply said slide window based normalization by multiplying said decision time metric by an absolute value of a difference between a value of said window function and said mean value of said window function.

9. The apparatus according to claim 6, wherein the apparatus is configured to perform said correlation for said decision time metric over the length of said replica signal, and to obtain said decision time metric for a total frame length of said received time division duplex signal.

10. The apparatus according to claim 6, wherein said synchronization pattern indicates a position of a downlink synchronization channel used for accessing a wireless network.

11. A terminal device comprising an apparatus according to claim 6.

12. A receiver module comprising an apparatus according to claim 6.

13. A communication system comprising an apparatus according to claim 6 and a base station or access device for broadcasting said time division duplex signal.

14. An apparatus comprising:

means for receiving a time division duplex signal with a periodic first time period allocated to at least one downlink timeslot transmission and a periodic second time period allocated to at least one uplink timeslot transmission;

means for obtaining a decision time metric by correlating said received signal with a replica signal in order to detect a synchronization pattern provided in said first time period allocated to the at least one downlink timeslot transmission; and means for applying to said decision time metric a slide window based normalization with a time window long enough to accommodate said second time period allocated to the at least one uplink timeslot transmission.

15. A non-transitory computer-readable storage medium carrying one or more sequences of one or more instructions which, when executed by one or more processors, cause an apparatus to at least perform the following steps:

receiving a time division duplex signal with a periodic first time period allocated to at least one downlink timeslot transmission and a periodic second time period allocated to at least one uplink timeslot transmission;

determining to obtain a decision time metric by correlating said received signal with a replica signal in order to detect a synchronization pattern provided in said first time period allocated to the at least one downlink timeslot transmission; and determining to apply to said decision time metric a slide window based normalization with a time window long enough to accommodate said second time period allocated to the at least one uplink timeslot transmission.

* * * * *